(No Model.) 2 Sheets—Sheet 1.

C. A. CASE.
DRIVE CHAIN.

No. 437,978. Patented Oct. 7, 1890.

WITNESSES:
E. J. Griswold
John Revell

INVENTOR
Charles A. Case
BY
Howson and Howson
his ATTORNEYS (No Model.) 2 Sheets—Sheet 2.

C. A. CASE.
DRIVE CHAIN.

No. 437,978. Patented Oct. 7, 1890.

WITNESSES:
E. J. Griswold
John Revell

INVENTOR
Charles A. Case
BY
Howson and Howson
his ATTORNEYS

UNITED STATES PATENT OFFICE.

CHARLES A. CASE, OF NEW YORK, N. Y.

DRIVE-CHAIN.

SPECIFICATION forming part of Letters Patent No. 437,978, dated October 7, 1890.

Application filed June 2, 1890. Serial No. 353,990. (No model.)

*To all whom it may concern:*

Be it known that I, CHARLES A. CASE, a citizen of the United States, and a resident of New York city, New York, have invented an Improved Detachable-Link Chain, of which the following is a specification.

My invention consists of an improved chain with detachable links, which chain shall be more especially adapted for use in connection with buckets for endless elevators, conveyers, or dredging-machines, but may also be applied to various other uses, such as an ordinary drive-chain.

Figure 1:
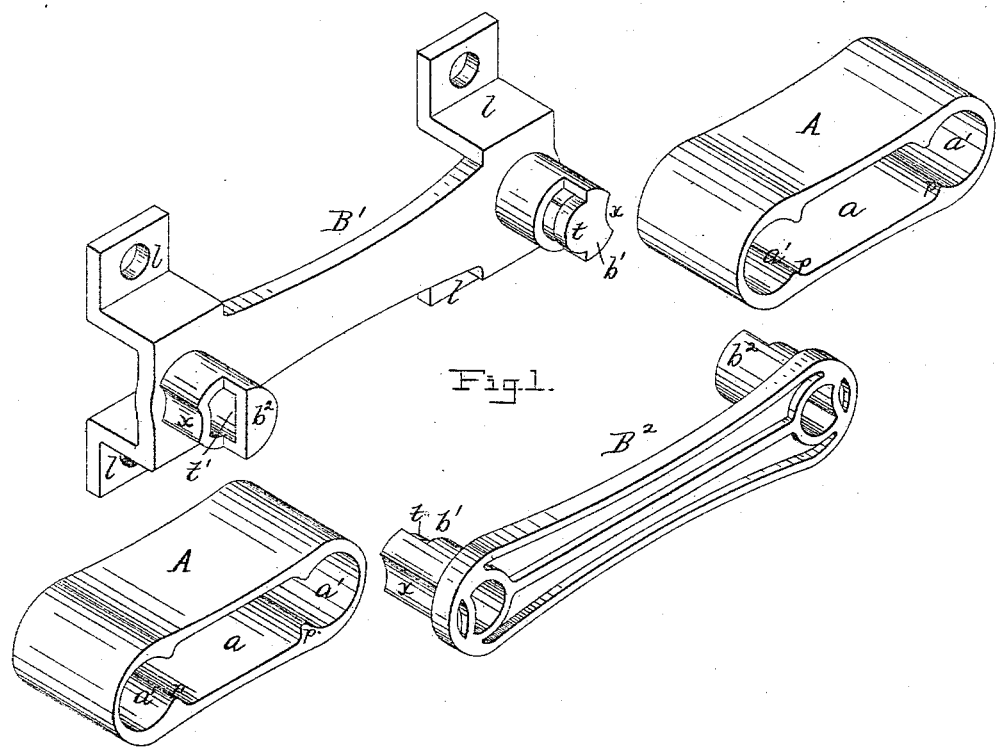
Figure 6:
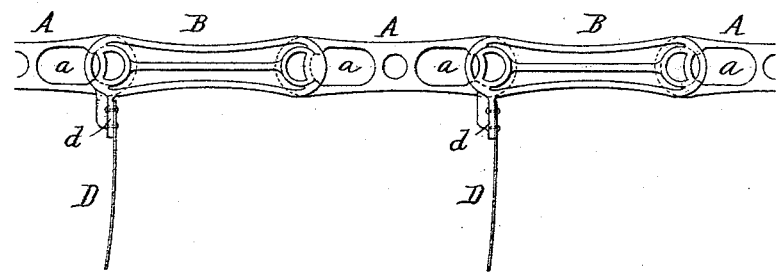
Figure 7:
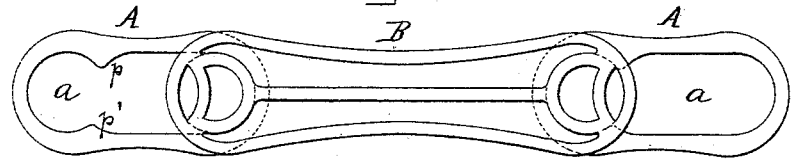
Figure 2:
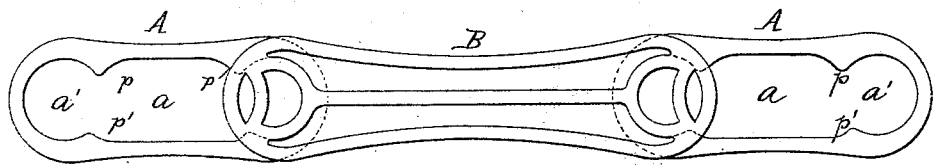
Figure 3:
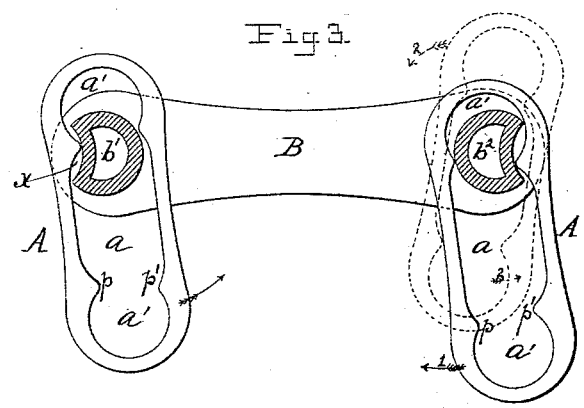
Figure 4:
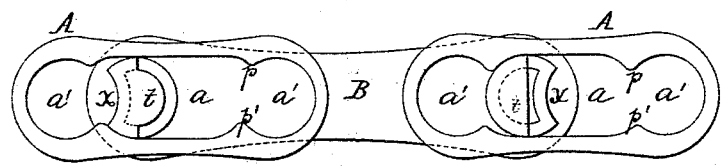
Figure 5:
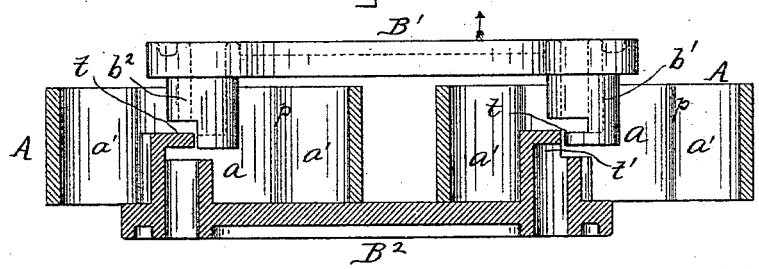

In the accompanying drawings, Figure 1 is a perspective view showing three links of my improved chain detached from each other and as specially constructed for use in connection with elevator, conveyer, or dredging buckets. Fig. 2 is a side view of the same three links, showing them connected together for use, but without the lugs to secure one of the links to the bucket. Fig. 3 is a sectional view showing the manner of turning the single links in order to permit the parts of the two-part link to be separated. Fig. 4 is a side view showing two single links and one half of the intermediate two-part link, from which the other half has been detached. Fig. 5 is a longitudinal section showing the manner of detaching one half of the two-part link. Fig. 6 is a view illustrating the use of my improved chain for a conveyer with blades, and Fig. 7 is a side view showing the preferred form of the links when the chain is to be used as an ordinary drive chain.

In the several figures I have shown but three links, of which two A A are single links and each alike made in one piece, while the third B is made in two parts B' B². It will be understood that the links A and B simply alternate throughout the length of the chain, which may be of any size and length.

In the construction shown in Figs. 1 to 5 the single links A A are each shown as having an elongated opening $a$, connected with a circular opening $a'$ at each end, this circular opening and the elongated opening being formed by intermediate inward projections $p$ $p'$. As hereinafter referred to, one of these rounded openings $a'$ at one end of the link A may be dispensed with, as illustrated, for example, in the modification, Fig. 7.

The link B is a two-part link, each part B' B² consisting of a side plate $b$ and half-pins $b'$ $b^2$. These pins $b'$ $b^2$ of the two parts of the link are adapted to be so locked together that one pair forms at one end of the link the connecting pivot-pin for one link A, while the other half-pins at the other end of the link B form the connecting pivot-pin for the other link A. One of these half-pins $b'$ has a tongue $t$ to enter a corresponding groove $t'$ on the corresponding half-pin of the other half of the link, so that by bringing the two half-pins together with this tongue $t$ on one in line with the groove $t'$ on the other corresponding half-pin, and then moving one half of the link longitudinally with reference to the other, these tongues and grooves will interlock, and these half-pins will then fit together to make perfect axes for the links A. The axes thus constituted are cylindrical for more than half of their circumference; but one side, (preferably the outer side) of each is cut away and preferably recessed with a reversed curve, as at $x$, Figs. 3 and 4, so that while these pins form perfect bearing-surfaces as pivots for the correspondingly-rounded openings $a'$ $a'$ of the links A when they are in position, Fig. 2, and will thus effectually prevent the two halves of the link B from becoming detached, yet when it is desired to separate the chain one half of the link B may be detached from the other half. In each case the links A are turned, as indicated by the arrows in Fig. 3, to bring one of the projections $p$ on each link into the recess $x$ in the corresponding pivot $b'$ $b^2$ of the two-part link, so that then these pivots will enter the elongated portions $a$ of the openings in the links A in the manner indicated by dotted lines in Fig. 3 and by full lines in Fig. 4. Then, as will be understood on reference to Figs. 4 and 5, one half of the link B can be moved longitudinally with reference to the other half to a sufficient extent to enable the tongues $t$ to become disengaged from the retaining-grooves $t'$, so that one half of the link can be separated from the other and the several links be thus detached from each other. As shown in Figs. 1, 4, and 5, the side plates of the two-part link B are preferably grooved and ribbed to make a better casting, and for the same purpose the half-pins $b'$ $b^2$ are made hollow. This construction of link is especially adapted for use in connection with elevator, conveyer, or dredging buckets, for by providing one of the side plates of the two-part link B with lugs $l$, as illustrated in Fig. 1, that part of the link may be riveted to the bucket in the workshop, and the bucket thus supplied can be put in place in the elevator and there fitted together into the endless chain. The described construction of chain also readily adapts itself to a construction of conveyer in which blades D are used, such as shown in Fig. 6, these blades being riveted to lugs $d$, cast or otherwise formed upon the links. In this case it will be preferable to make the intermediate links A of the same length as the two-part links and with the elongated opening $a$ duplicated, as illustrated in Fig. 6.

When my improvement is applied to a drive-chain, the two-part links B may be conveniently shortened and the intermediate links A made each with a single rounded opening $a'$ and elongated opening $a$, as shown in Fig. 7.

I claim as my invention—

1. A detachable-link chain consisting of single links each with inward projections forming one or more rounded openings and an elongated opening and two-part links each with pivot-pins in two parts tongued and grooved to fit together, and having cut-away portions or recesses $x$, substantially as and for the purpose set forth.

2. A detachable-link chain consisting of single and two-part links, each single link having inward projections to form one or more rounded openings and an elongated opening, while the two-part links have each tubular half-pins with tongues and grooves to fit together and form pivot-pins for the single links which retain the two parts of the other link together when the pivot-pins are in the rounded openings of the single links, but permit the two parts of the link to be separated and detached when the said pivot-pins are transferred to the elongated openings, and also grooves in the direction of the length of the pintles, all substantially as described.

3. A detachable-link chain consisting of single links and two-part links, the two-part links having half-pins tongued and grooved to fit together to form pivots for and be held together by the single links when in place, all substantially as described.

In testimony whereof I have signed my name to this specification in the presence of two subscribing witnesses.

CHARLES A. CASE.

Witnesses:
JOHN REVELL,
HUBERT HOWSON.